United States Patent [19]

Matsumoto

[11] Patent Number: 5,489,999
[45] Date of Patent: Feb. 6, 1996

[54] LIQUID CRYSTAL DISPLAY DEVICE HAVING A CIRCUIT BOARD DISPOSED AT A RECESS OF A LIGHT GUIDE PLATE

[75] Inventor: Takumi Matsumoto, Yamato-Takada, Japan

[73] Assignee: Sharp Kabushiki Kaisha, Osaka, Japan

[21] Appl. No.: 280,860

[22] Filed: Jul. 26, 1994

[30] Foreign Application Priority Data

Jul. 27, 1993 [JP] Japan ..................... 5-184668

[51] Int. Cl.$^6$ ..................... G02F 1/1335; G02F 1/1333; H02H 5/04
[52] U.S. Cl. .................... 359/49; 359/83; 362/31
[58] Field of Search ................. 359/48, 49, 83; 362/26, 27, 31

[56] References Cited

U.S. PATENT DOCUMENTS

| 4,914,553 | 4/1990 | Hamada et al. | 359/49 |
| 5,029,984 | 7/1991 | Adachi et al. | 359/48 |
| 5,055,978 | 10/1991 | Rogoff | 362/31 |
| 5,146,354 | 9/1992 | Plesinger | 359/49 |

FOREIGN PATENT DOCUMENTS

| 52-20795 | 2/1977 | Japan | 359/49 |
| 2-52313 | 2/1990 | Japan . | |
| 4-329520 | 11/1992 | Japan | 359/48 |
| 5-34693 | 2/1993 | Japan | 359/48 |

*Primary Examiner*—William L. Sikes
*Assistant Examiner*—Charles Miller
*Attorney, Agent, or Firm*—David G. Conlin; Kevin J. Fournier

[57] ABSTRACT

A liquid crystal display device comprises an edge light type of a light guide plate for a backlight, having an inclined surface. A back light lamp disposed in a side of a wide edge surface of the light guide plate. A liquid crystal display panel disposed in a side of a rear surface of the light guide plate. A circuit board disposed at a recess of the inclined surface of the light guide plate. A tape carrier connecting the liquid crystal display panel and said circuit board with each other. And an integrated circuit disposed on the tape carrier for driving the liquid crystal panel.

5 Claims, 3 Drawing Sheets

LIQUID CRYSTAL DISPLAY DEVICE HAVING A CIRCUIT BOARD DISPOSED AT A RECESS OF A LIGHT GUIDE PLATE

BACKGROUND OF THE INVENTION

1. Field of the Invention

The present invention relates to a construction of a liquid crystal display device, more particularly, relates to a liquid crystal display device which incorporates or can incorporate an edge light type of a backlight.

2. Description of the Related Art

In a prior liquid crystal display, a printed circuit board or a tape carrier having a circuit and the like which drives a liquid crystal panel is fixed on an electrode portion of a liquid crystal display panel.

Further, a liquid crystal display itself does not emit a light, but display a pattern and the like by controlling a transmittance or a reflectance of a light. Therefore, the liquid crystal display has a characteristic in which a display is hard to be seen unless an illuminating apparatus is installed in a dark circumference.

FIG. 6 shows a sectional view of a prior liquid crystal display disclosed in Japanese Patent Application Laying Open (KOKAI) No. 2-52313. In FIG. 6, the prior liquid crystal display device comprises a liquid crystal display panel 1, a driving LSI (IC) 2 for driving the liquid crystal display panel 1, a tape carrier 3, a backlight 4, and a circuit board 5. The prior liquid crystal display has the liquid crystal display panel 1 in a light emitting surface side of the backlight 4, and has the circuit board 5 in a rear surface side thereof. Then, they are connected to each other to the tape carrier 3 fitted with the driving IC 2.

The liquid crystal display panel 1 is a display panel in which a liquid crystal is put between electrodes. An incident/reflective light is changed by applying a voltage to the electrodes.

The driving LSI (IC) 2 is an integrated circuit in which a circuit outputting a driving signal to the liquid crystal display panel 1 is integrated, and the integrated circuit is disposed on the tape carrier 3.

The tape carrier 3 is a thin type of a flexible printed circuit board having a conductive pattern, and transmits the driving signal to the liquid crystal display panel 1.

The backlight 4 emits a light from the rear surface side thereof to the liquid crystal display panel 1, and is disposed between the circuit board 5 and the liquid crystal display panel 1.

The circuit board 5 is equipped with a signal circuit for actuating the driving LSI 2.

The tape carrier 3 disposed between the liquid crystal display panel 1 and the circuit board 5 is bonded to an electrode portion of the liquid crystal display panel 1, and also fixed on the circuit board 5 by means of a soldering.

For example, in the prior liquid crystal display device shown in FIG. 6, a thicker transparent flat plate than a lamp as a light source is generally used for a light guide plate, in a case where an edge light type of a backlight is used. In this case, a thickness of the liquid crystal display device as a whole is inevitably a total thickness of respective thicknesses of the light guide plate 4 for the backlight, the liquid crystal display panel 1 and the circuit board 5. As a result, it is difficult to make the liquid crystal display device thin. Further, there is a possibility that the LSI receives a light leaked from the edge of the light guide plate, performs an abnormal operation and carries out an erroneous liquid crystal displaying.

SUMMARY OF THE INVENTION

It is therefore an object of the present invention to provide a liquid crystal display which prevents a driving integrated circuit from receiving a light leaked from an edge of a light guide plate for a backlight, from performing an erroneous operation and carrying out an erroneous liquid crystal displaying.

The abovementioned object of the present invention is attained by a liquid crystal display device comprising: an edge light type of a light guide plate for a backlight, having an inclined surface; a back light lamp disposed in a side of a wide edge surface of the light guide plate; a liquid crystal display panel disposed in a side of a rear surface of the light guide plate; a circuit board disposed at a recess of the inclined surface of the light guide plate; a tape carrier connecting said liquid crystal display panel and the circuit board with each other; and an integrated circuit disposed on the tape carrier for driving the liquid crystal panel.

Therefore, a thickness of a liquid crystal display device as a whole can be made thinner than a total thickness of respective thicknesses of the backlight light guide plate, the liquid crystal displaying panel and the circuit board.

Further, the liquid crystal display device prevents the driving integrated circuit from receiving a light leaked from a backlight light guide edge, performing an abnormal operation and carrying out an erroneous liquid crystal displaying.

According to the present invention, a liquid crystal display device can be made thin and prevent a driving integrated circuit from receiving a light reflection leaked from an edge of a light guide plate for a backlight, prevent from performing an abnormal operation and carrying out an erroneous liquid crystal displaying. Further, the display device can be thinned, as a whole, by mounting an inverter board of a lamp in a side of an inclined surface (non light emitting side) of a light guide plate. In addition, a display screen having a high intensity can be attained by employing a L shaped lamp.

In a liquid crystal display according to the present invention, light reflection coatings are disposed on edge surfaces of the light guide plate except for other edge surface of the light guide plate for receiving or emitting a light.

In the liquid crystal display according to the present invention, a lamp inverter circuit or other circuit board can be mounted in a side of the inclined surface of the light guide plate.

In a liquid crystal display according to the present invention, the liquid crystal display panel is provided with a tape carrier at two sides thereof, and L shaped lamp is disposed at other two sides of the liquid crystal display panel opposed to the two sides with the tape carrier.

In a liquid crystal display according to the present invention, the light guide plate has two inclined surfaces, one of the inclined surfaces being inclined along one of the two sides and the other of the inclined surfaces being inclined along a perpendicular direction to the one of the inclined surfaces.

Further objects and advantages of the present invention will be apparent from the following description of the preferred embodiments (embodiment) of the invention as illustrated in the accompanying drawings.

DESCRIPTION OF THE PREFERRED EMBODIMENTS

One embodiment of a liquid crystal display device according to the present invention will be described hereinafter with reference to FIGS. 1 to 3.

Figure 1:
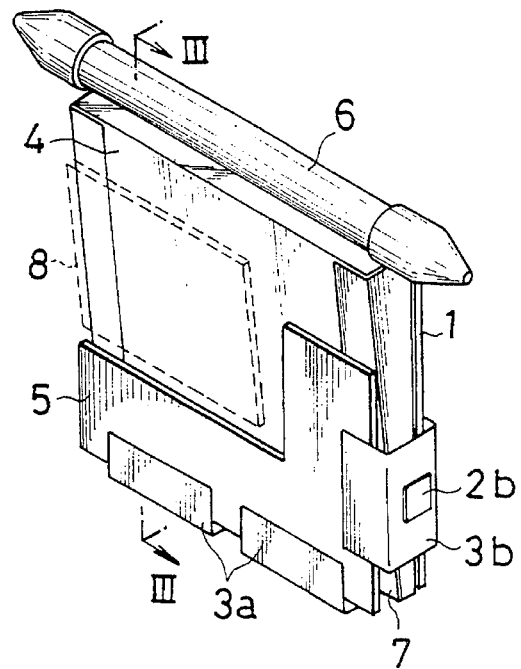
FIG. 1 is a perspective view of one embodiment of a liquid crystal display device according to the present invention.
Figure 2:
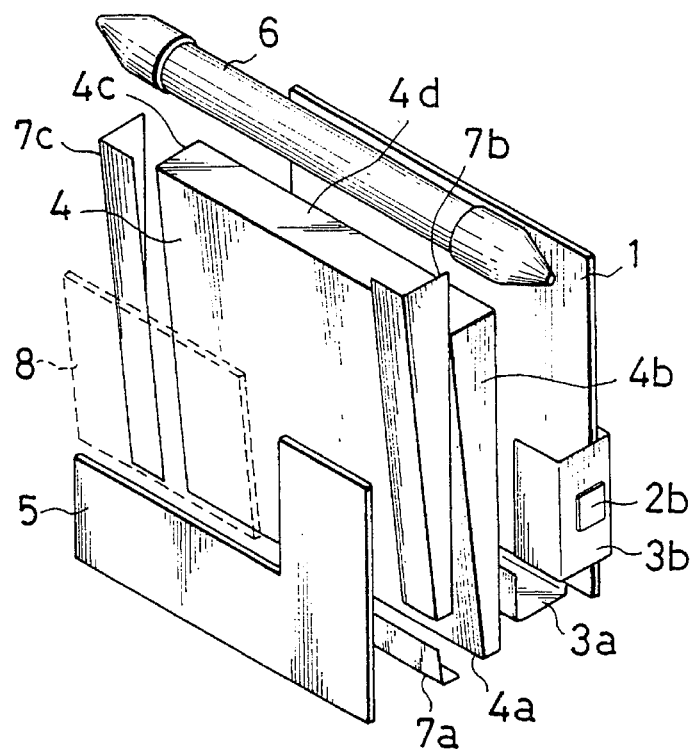
FIG. 2 is an exploded perspective view of one embodiment of a liquid crystal display device according to the present invention.

FIG. 1 is a perspective view of one embodiment of the present invention, FIG. 2 is an exploded perspective view of the same. FIG. 3 is a sectional view seen from a III—III line of FIG. 1. A liquid crystal display device comprises a liquid crystal display panel 1, a driving LSI (IC) 2 for driving the liquid crystal display panel 1, a tape carrier 3, a light guide plate 4 for a backlight, a circuit board 5, a lamp 6, a light reflection coating 7 and an inverter board 8. The light guide plate 4 is inclined at one surface thereof.

Figure 3:
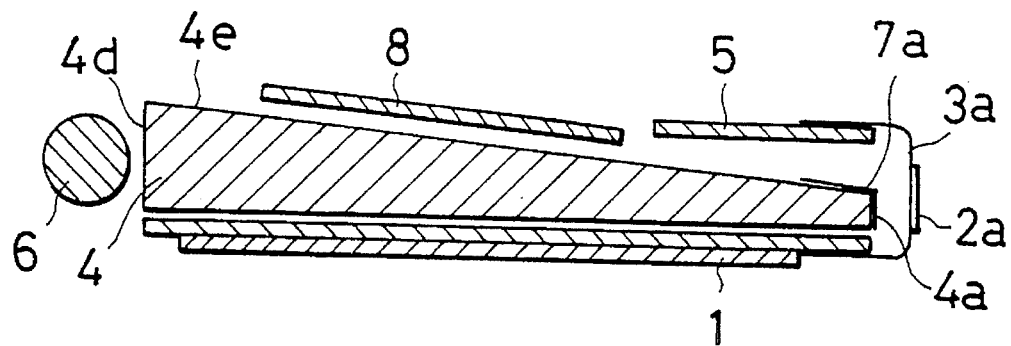
FIG. 3 is a sectional view seen from a III—III line of FIG. 1.

As shown in FIG. 3, a tape carrier 3a equipped with a driving LSI 2a for driving a liquid crystal panel 1 and a circuit board 5 connected with the tape carrier 3a are disposed in a side of a narrow edge surface 4a of the light guide plate 4. The lamp 6 is disposed in a side of a wide edge surface 4d of the light guide plate 4. The circuit board 5 is disposed at a recess of the inclined surface 4e of the light guide plate 4. Thereby, a liquid crystal display device can be made thinner than a liquid crystal display device having a flat type of light guide plate.

Furthermore, as shown in FIG. 2, light reflection coatings 7a, 7b and 7c are covered on the edge surfaces 4a, 4b and 4c of the light guide plate 4 except an edge surface 4d receiving or emitting a light. Therefore, the liquid crystal display device can prevent the driving LSIs 2a, 2b and 2c from receiving a light, which is emitted from the lamp 6 and passing through the light guide plate 4 and going out from other edge, and can prevent the LSIs 2a, 2b and 2c from performing an abnormal operation and from carrying out an erroneous liquid crystal displaying. Further, as shown in FIG. 3, the liquid crystal display can be made thin, as a whole, by mounting the inverter board 8 in a side of the inclined surface 4e of the light guide plate 4.

Figure 4:
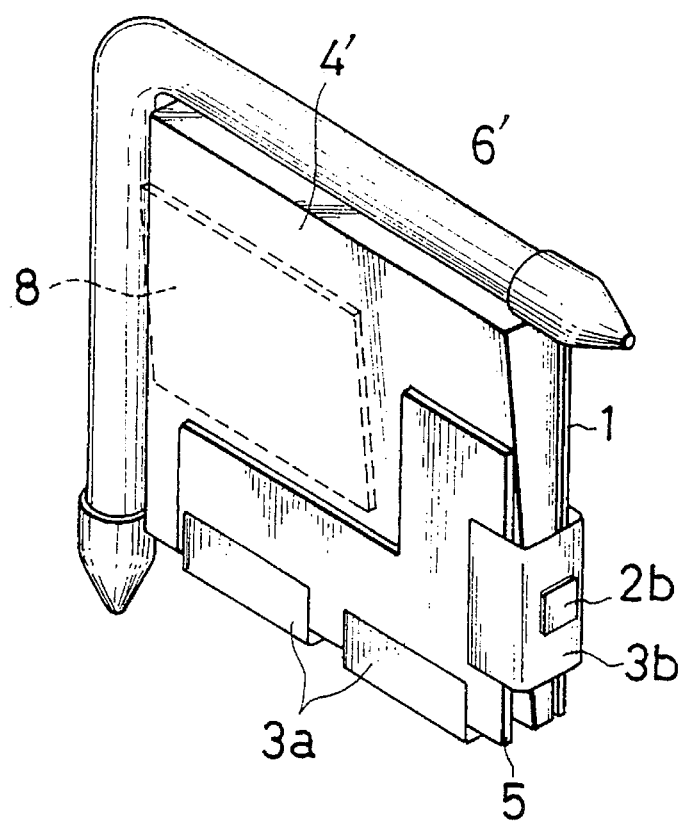
FIG. 4 is a perspective view of another embodiment of a liquid crystal device with a L shaped lamp according to the present invention.
Figure 5:
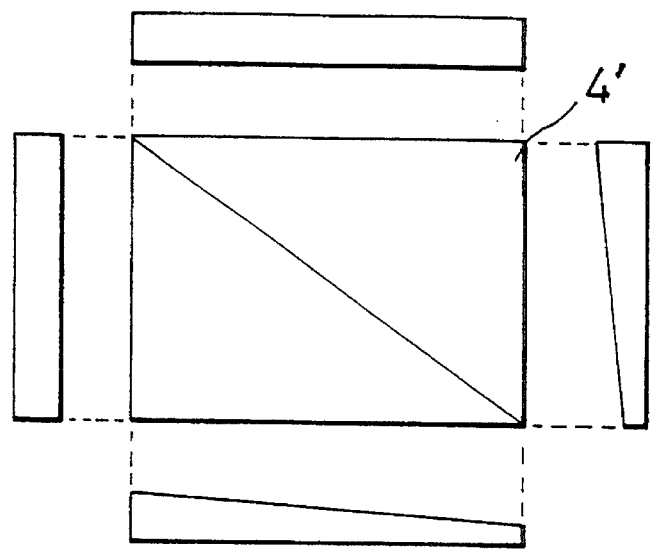
FIG. 5 is a five sides view of another embodiment of a light guide plate for the L shaped lamp.
Figure 6:
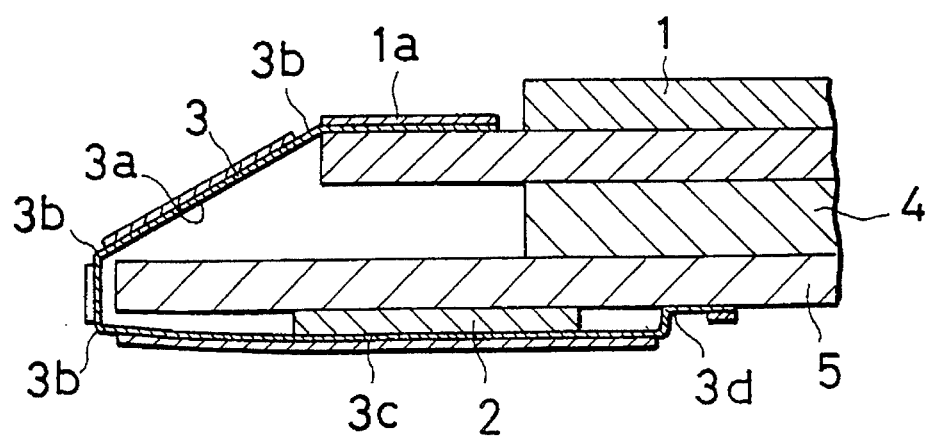
FIG. 6 is a sectional view of a prior liquid crystal display device.

FIG. 4 shows another embodiment of the present invention, in which a L shaped lamp is applied. FIG. 5 shows a five sides view of the said embodiment in which a light guide plate 4' is designed for the L shaped lamp 6'. The liquid crystal display device of FIG. 4 has the liquid crystal display panel 1, the light guide plate 4 and the circuit board 5 overlaid in order as shown in FIG. 3.

The liquid crystal display panel 1 is connected through the tape carrier 3 to the circuit board 5. In the liquid crystal display device mentioned above, in a case where the liquid crystal display panel 1 has two signal inputting portions arranged at two sides thereof respectively, thereby the L shaped lamp 6' can be applied. In this case, as shown in FIG. 5, the light guid plate 4' has two inclined surfaces, one of the inclined surfaces is inclined along one of the two sides and the other of the inclined surfaces is inclined along a perpendicular direction of the one of the inclined surfaces, and the liquid crystal display device has a construction similar to the abovementioned one embodiment. Therefore, it is possible to obtain a similar effect mentioned above and possible to make a brightness of the display device higher. Incidentally, shapes, numbers and arrangements of the carrier and the board are not limited to contents of the abovementioned embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal display device comprising:
    a wedge shaped edge light type light guide plate for a backlight, having an inclined major front surface;
    a back light lamp disposed adjacent to a wide edge surface of said light guide plate;
    a liquid crystal display panel disposed adjacent to the rear surface of said light guide plate;
    a circuit board disposed adjacent to said front surface in the thinnest region of said light guide plate without extending along the entire said front surface;
    a tape carrier connecting said liquid crystal display panel and said circuit board with each other; and
    an integrated circuit disposed on said tape carrier for driving said liquid crystal panel.

2. A liquid crystal display according to claim 1, wherein light reflection coatings are disposed on edge surfaces of said light guide plate except for the edge surfaces of said light guide plate for receiving or emitting a light.

3. A liquid crystal display according to claim 1, wherein a lamp inverter circuit or other circuit board is mounted adjacent said front surface and next to said circuit board without extending to the thickest region of said light guide plate.

4. A liquid crystal display according to claim 1, wherein said liquid crystal display panel is provided with a tape carrier at two sides thereof, and an L shaped lamp is disposed at the other two sides of said liquid crystal display panel opposed to said two sides with said tape carrier.

5. A liquid crystal display device comprising:
    an edge light type light guide plate for a backlight, having a major front surface, a major rear surface and four minor side surfaces, wherein said front surface consist of two inclined surface sections, one of said inclined surface sections being inclined in a direction from said first side surface and the other inclined surface section being inclined in a direction from said second side surface, wherein said first and second side surfaces are adjacent and orthogonal;
    an L shaped lamp disposed adjacent to said first and second side surfaces;
    a liquid crystal display panel disposed adjacent to said rear surface of said light guide plate;
    a circuit board disposed adjacent to said front surface in the thinnest region of said light guide plate without extending along the entire said front surface;
    a tape carrier disposed adjacent to said third and fourth side surfaces connecting said liquid crystal display panel with said circuit board.

* * * * *